United States Patent
Chang et al.

(10) Patent No.: US 9,686,090 B2
(45) Date of Patent: *Jun. 20, 2017

(54) COMMUNICATION CONTROL METHOD, BASE STATION, AND USER TERMINAL

(71) Applicant: KYOCERA CORPORATION, Kyoto (JP)

(72) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,146

(22) Filed: Sep. 20, 2016

(65) Prior Publication Data

US 2017/0012792 A1 Jan. 12, 2017

Related U.S. Application Data

(63) Continuation of application No. 14/373,471, filed as application No. PCT/JP2013/051667 on Jan. 25, 2013, now Pat. No. 9,479,986.

(Continued)

(51) Int. Cl.
H04W 36/22 (2009.01)
H04L 12/18 (2006.01)
(Continued)

(52) U.S. Cl.
CPC .............. H04L 12/189 (2013.01); H04W 4/06 (2013.01); H04W 36/0005 (2013.01);
(Continued)

(58) Field of Classification Search
None
See application file for complete search history.

(56) References Cited

U.S. PATENT DOCUMENTS 9,479,986 B2 * 10/2016 Chang ................ H04W 4/06
2003/0176192 A1 9/2003 Morimoto et al.
(Continued)

FOREIGN PATENT DOCUMENTS

JP 2003-264869 A 9/2003
JP 2009-260895 A 11/2009
(Continued)

OTHER PUBLICATIONS

International Search Report; PCT/JP2013/051667; Apr. 2, 2013.
(Continued)

Primary Examiner — Mohammad Adhami
(74) Attorney, Agent, or Firm — Studebaker & Brackett PC

(57) ABSTRACT

A communication control method is employed in a mobile communication system including a general cell supporting PTM transmission of MBMS data and a specific cell not supporting PTM transmission of the MBMS data. The method comprises: a step A of broadcasting general cell load information from the general cell; a step B of receiving the general cell load information broadcasted in the step A, by a user terminal which receives the MBMS data from the general cell in an idle mode with the general cell selected as a cell on which to camp; and a step C of controlling cell reselection from the general cell to the specific cell by the user terminal, based on the general cell load information received in the step B.

3 Claims, 8 Drawing Sheets

Related U.S. Application Data

(60) Provisional application No. 61/591,462, filed on Jan. 27, 2012.

(51) Int. Cl.
*H04W 4/06* (2009.01)
*H04W 36/00* (2009.01)
*H04W 76/00* (2009.01)
*H04W 84/04* (2009.01)

(52) U.S. Cl.
CPC ......... *H04W 36/22* (2013.01); *H04W 76/002* (2013.01); *H04W 84/045* (2013.01)

(56) References Cited

U.S. PATENT DOCUMENTS

| | | |
|---|---|---|
| 2005/0201331 A1 | 9/2005 | Gaal et al. |
| 2007/0060192 A1 | 3/2007 | Morimoto et al. |
| 2009/0143075 A1 | 6/2009 | Morimoto et al. |
| 2011/0038431 A1 | 2/2011 | Frederiksen et al. |
| 2011/0053597 A1 | 3/2011 | Lee et al. |
| 2011/0086641 A1 | 4/2011 | Guvenc et al. |
| 2011/0211452 A1 | 9/2011 | Murakami et al. |
| 2011/0256824 A1 | 10/2011 | Futaki et al. |
| 2011/0305184 A1 | 12/2011 | Hsu |
| 2012/0108239 A1 | 5/2012 | Damnjanovic et al. |
| 2012/0190363 A1* | 7/2012 | Maeda .................. H04W 48/02 455/435.1 |
| 2013/0035134 A1 | 2/2013 | Suzuki et al. |
| 2013/0095838 A1 | 4/2013 | Uemura et al. |
| 2013/0122901 A1 | 5/2013 | Chen et al. |
| 2013/0242767 A1 | 9/2013 | Sfar |

FOREIGN PATENT DOCUMENTS

| | | |
|---|---|---|
| JP | 2011-004399 A | 1/2011 |
| JP | 2011-234039 A | 11/2011 |
| WO | 2009/025494 A2 | 2/2009 |
| WO | 2010/053098 A1 | 5/2010 |
| WO | WO2011039959 * | 4/2011 |

OTHER PUBLICATIONS

Kyocera; "MBMS service continuity for inbound mobility to CSG cells"; 3GPP TSG-RAN WG2#76 R2-115952; San Francisco, USA Nov. 18, 2011.

LG Electronics Inc.; "Mobility between a MBMS cell and a CSG cell"; 3GPP TSG-RAN WG2#75 R2-114461; Athens, Greece Aug. 26, 2011.

Huawei; "Service continuity improvements for MBMS for LTE"; 3GPP TSG-RAN#51 RP-111374; Fukuoka, Japan, 13-16, 2011.

The extended European search report issued by the European Patent Office on May 28, 2015, which corresponds to European Patent Application No. 13740982.7-1854 and is related to U.S. Appl. No. 14/373,471.

Communication pursuant to Rules 70(2) and 70a(2) EPC issued by the European Patent Office on Jun. 16, 2015, which corresponds to European Patent Application No. 13740982.7-1854 and is related to U.S. Appl. No. 14/373,471.

Kyocera; "MBMS service continuity for inbound mobility to non-MBMS capable cells"; 3GPP TSG-RAN WG2 #75; R2-114095; Aug. 22-26, 2011; pp. 1-4; Athens, Greece.

An Office Action; "Notice of Reasons for Rejection," issued by the Japanese Patent Office on Jun. 2, 2015, which corresponds to Japanese Patent Application No. 2013-555337 and is related to U.S. Appl. No. 14/373,471; with English language Statement of relevance.

Qualcomm Incorporated; "Service Continuity for MBMS UEs in RRC_IDLE mode"; 3GPP TSG-RAN2 Meeting #75; R2-113915; Aug. 22-26, 2011; pp. 1-5; Athens, Greece.

* cited by examiner

FIG. 10

|  | MACROCELL (LOW LOAD); CSG CELL (LOW LOAD) | MACROCELL (HIGH LOAD); CSG CELL (LOW LOAD) | MACROCELL (LOW LOAD); CSG CELL (HIGH LOAD) | MACROCELL (HIGH LOAD); CSG CELL (HIGH LOAD) |
|---|---|---|---|---|
| UNICAST NECESSARY; MBMS NECESSARY | MACROCELL | CSG CELL | MACROCELL | MACROCELL |
| UNICAST NECESSARY; MBMS UNNECESSARY | CSG CELL | CSG CELL | MACROCELL | TBD |
| UNICAST UNNECESSARY; MBMS NECESSARY | MACROCELL | MACROCELL | MACROCELL | MACROCELL |

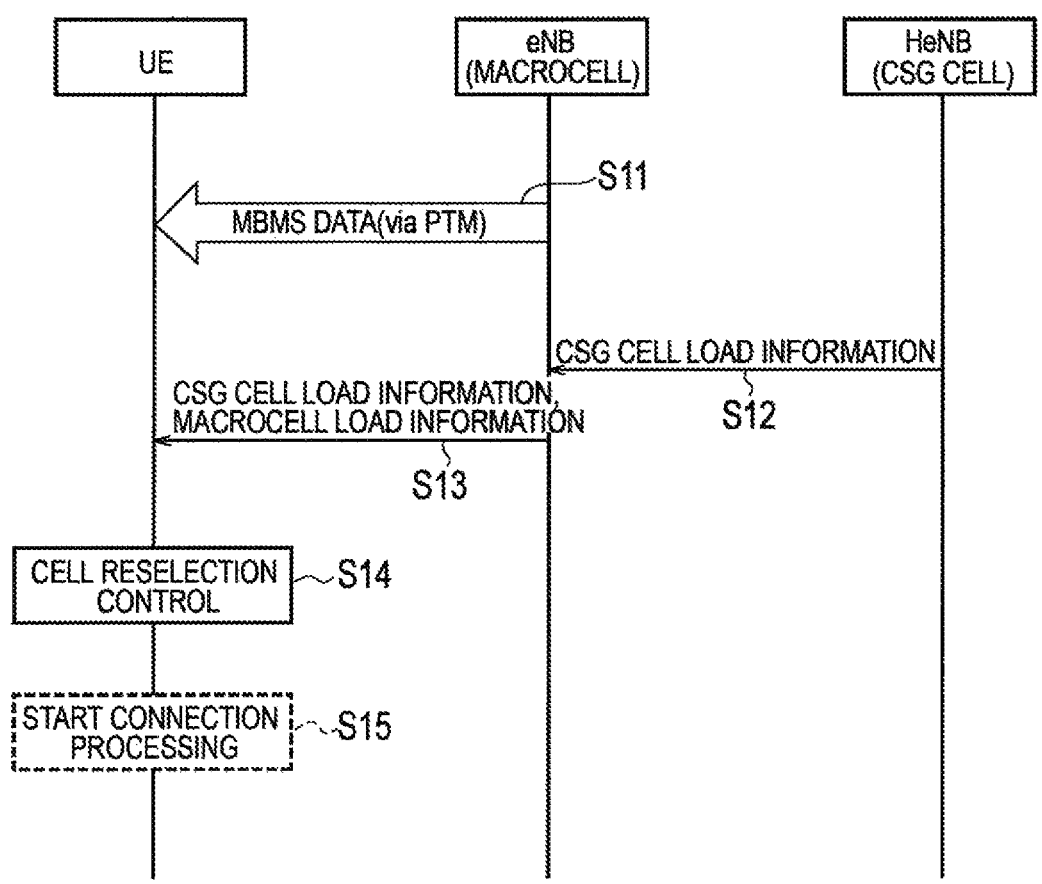

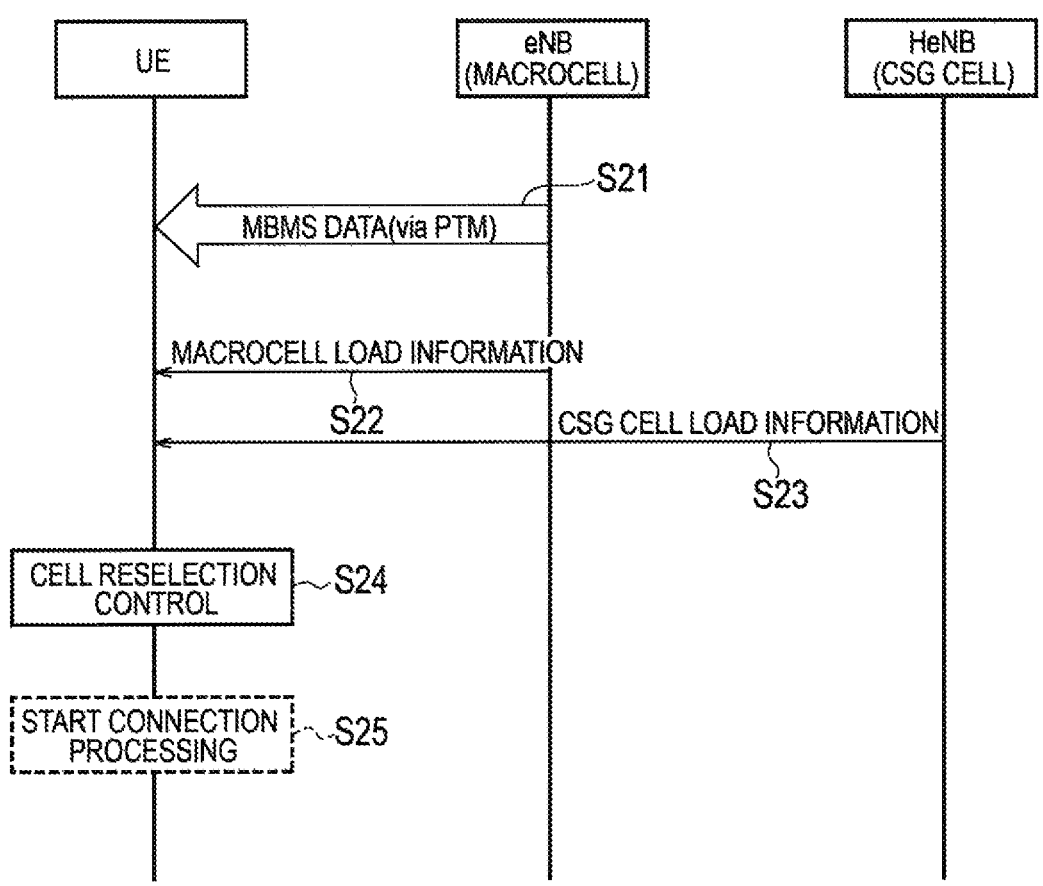

COMMUNICATION CONTROL METHOD, BASE STATION, AND USER TERMINAL

CROSS REFERENCE TO RELATED APPLICATION

This application is a Continuation Application of U.S. patent application Ser. No. 14/373,471 filed on Jul. 21, 2014, which is U.S. National Phase Application of International Patent Application No. PCT/JP2013/051667 filed on Jan. 25, 2013, which claims the benefit of U.S. Provisional Patent Application No. 61/591,462 filed on Jan. 27, 2012; the entire contents of which are incorporated herein by reference.

TECHNICAL FIELD

The present disclosure relates to a communication control method, a base station and a user terminal, employed in a mobile communication system including a general cell supporting PTM transmission of MBMS data and a specific cell not supporting PTM transmission of MBMS data.

BACKGROUND ART

In 3GPP (3rd Generation Partnership Project) which is a standardization project of mobile communication systems, standardization of eMBMS (evolved Multimedia Broadcast Multicast Service) is in progress (see Non-patent Document 1, for example).

In such a mobile communication system, a general cell (such as a macrocell) supports MBMS and is capable of transmitting MBMS data by multicast (Point-To-Multipoint: PTM).

In contrast, a specific cell (such as a CSG cell) not supporting MBMS is not capable of transmitting MBMS data by PTM. Hence, studies are being made to transmit MBMS data by unicast (Point-To-Point: PTP) to a user terminal which establishes a connection with a specific cell.

Note that the term "cell" is used not only to indicate the smallest unit of a radio communication area, but also to indicate a function of performing radio communication with a user terminal.

PRIOR ART DOCUMENT

Non-Patent Document

NON-PATENT DOCUMENT 1: 3GPP Contribution RP-111374, September 2011

SUMMARY

Assumed is a situation where, in a communication environment in which a general cell includes a specific cell operated at a frequency different from that of the general cell, a user terminal located at a point where the general cell overlaps the specific cell receives MBMS data transmitted from the general cell by PTM in an idle mode.

Under such a specific situation, it is difficult for the user terminal to determine whether or not to reselect the cell on which to camp from the general cell to the specific cell.

Against this background, the present disclosure aims to provide a communication control method, a user terminal, and a device capable of performing appropriate cell reselection.

A communication control method comprises: transmitting load information on load of a second radio communication apparatus, by a first radio communication apparatus supporting PTM (Point-to-Multipoint) transmission of MBMS (Multimedia Broadcast Multicast Service) data, wherein the second radio communication apparatus does not support PTM transmission of MBMS data; receiving the MBMS data from the first radio communication apparatus, by a user terminal in an idle mode with the first radio communication apparatus selected as a communication target of the user terminal; receiving, from the first radio communication apparatus, the load information on the load of the second radio communication apparatus, by the user terminal; storing a list of identifiers on the second radio communication apparatus, by the user terminal; controlling a reselection of the communication target from the first radio communication apparatus to the second radio communication apparatus by the user terminal, based on the list of identifiers and the load information on the load of the second radio communication apparatus, the load information received from the first radio communication apparatus; and continuing a reception of the MBMS data by setting a highest priority for the first radio communication apparatus regardless of the load information, in response to desiring a contiguous reception of the MBMS data, by the user terminal.

A user terminal comprises: a receiver that receives load information on load of a second radio communication apparatus from a first radio communication apparatus supporting PTM (Point-to-Multipoint) transmission of MBMS (Multimedia Broadcast Multicast Service) data, the second radio communication apparatus not supporting PTM transmission of MBMS data, wherein the receiver receives the MBMS data from the first radio communication apparatus in an idle mode with the first radio communication apparatus selected as a communication target of the user terminal; and a controller that stores a list of identifiers on the second radio communication apparatus, and controls a reselection of the communication target from the first radio communication apparatus to the second radio communication apparatus based on the list of identifiers and the load information on the load of the second radio communication apparatus, the load information received fromthe first radio communication apparatus, wherein the controller continues a reception of the MBMS data by setting a highest priority for the first radio communication apparatus regardless of the load information, in response to desiring a contiguous reception of the MBMS data by the user terminal.

A device comprises: memory storing instructions; and processor configured to execute the instructions to perform processes of: receiving load information on load of a second radio communication apparatus from a first radio communication apparatus supporting PTM (Point-to-Multipoint) transmission of MBMS (Multimedia Broadcast Multicast Service) data, wherein the second radio communication apparatus does not support PTM transmission of MBMS data; receiving the MBMS data from the first radio communication apparatus in an idle mode with the first radio communication apparatus selected as a communication target of the user terminal; storing a list of identifiers on the second radio communication apparatus; controlling a reselection of the communication target fromthe first radio communication apparatus to the second radio communication apparatus based on the list of identifiers and the load of the second radio communication apparatus, the load information received from the first radio communication apparatus; and continuing a reception of the MBMS data by setting a highest priority for the first radio communication apparatus regardless of the load information, in response to desiring a contiguous reception of the MBMS data.

BRIEF DESCRIPTION OF THE DRAWINGS

FIG. 10 shows cell reselection control according to the first and second embodiments.

FIG. 11 is an operational sequence chart according to the first embodiment.

FIG. 12 is an operational sequence chart according to the second embodiment.

DESCRIPTION OF THE EMBODIMENTS

Summary of the Embodiments

Figure 1:
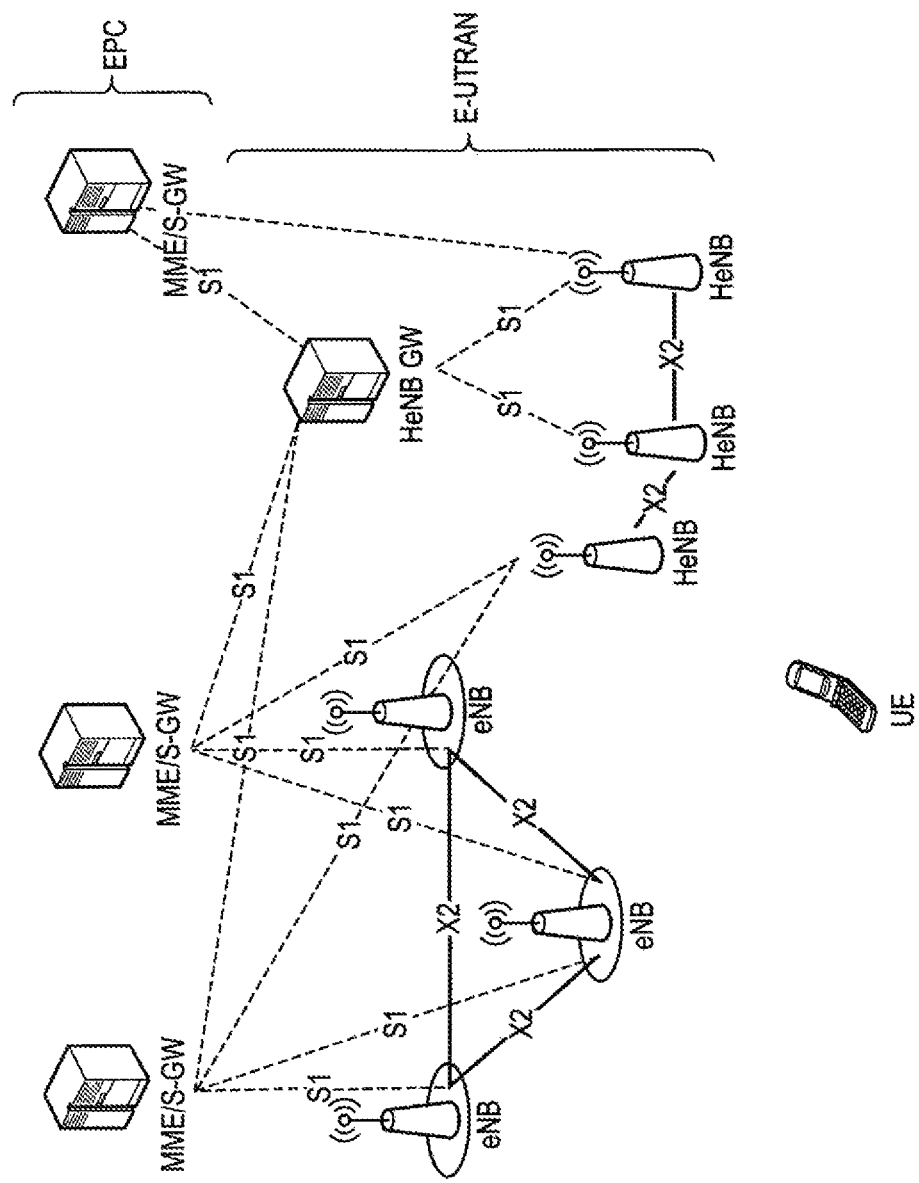
FIG. 1 shows a configuration of an LTE system according to first and second embodiments.

A communication control method is employed in a mobile communication system including a general cell (e.g., macrocell) supporting PTM transmission of MBMS data and a specific cell (e.g., CSG cell) not supporting PIM transmission of the MBMS data. The method includes: a step A of broadcasting general cell load information fromthe general cell; a step B of receiving the general cell load information broadcasted in the step A, by a user terminal which receives the MBMS data from the general cell in an idle mode with the general cell selected as a cell on which to camp; and a step C of controlling cell reselection from the general cell to the specific cell by the user terminal, based on the general cell load information received in the step B.

Thus, the user terminal receiving MBMS data from the general cell in the idle mode with the general cell selected as the cell on which to camp controls cell reselection from the general cell to the specific cell, based on the general cell load information.

For example, when the general cell is in a high load state, the user terminal assigns a higher cell selection priority for the specific cell to perform cell reselection from the general cell to the specific cell. Hence, connection establishment with the general cell in the high load state can be avoided, and degradation in the service quality received by the user terminal can be suppressed.

The communication control method may further include a step F of acquiring specific cell load information via a network interface by a general base station managing the general cell. In the step A, the general cell may broadcast the specific cell load information acquired in the step F together with the general cell load information. In the step B, the user terminal may receive the general cell load information and the specific cell load information broadcasted in the step A. In the step C, the user terminal may control cell reselection from the general cell to the specific cell based on the general cell load information and the specific cell load information received in the step B.

Alternatively, the communication control method may further include a step H of broadcasting specific cell load information from a specific base station managing the specific cell and a step I of receiving the specific cell load information sent in the step H by the user terminal. In the step C, the user terminal may control cell reselection from the general cell to the specific cell based on the general cell load information received in the step B and the specific cell load information received in the step I.

Thus, the user terminal receiving MBMS data from the general cell in the idle mode with the general cell selected as the cell on which to camp controls cell reselection from the general cell to the specific cell, based not only on the general cell load information but also on the specific cell load information. With this, the user terminal can control cell reselection from the general cell to the specific cell, by taking into consideration the load states of both of the general cell and the specific cell.

For example, when one of the general cell and the specific cell is in the high load state and the other is in the low load state, the user terminal assigns a lower cell selection priority for the one cell and/or assigns a higher cell selection priority for the other cell. Hence, connection establishment with the cell in the high load state can be avoided, and degradation in the service quality received by the user terminal can be suppressed.

In addition, in step C, the user terminal preferably controls cell reselection from the general cell to the specific cell by also taking into account whether or not uplink data to be sent is generated (i.e., whether or not unicast data needs to be exchanged).

Further, in step C, the user terminal preferably controls cell reselection from the general cell to the specific cell by also taking into account whether or not continuous reception of MBMS data is desired (i.e., whether or not the user is still interested in MBMS).

First Embodiment

In the first embodiment, a description is given by taking as an example a mobile communication system configured in accordance with the 3GPP standard of release 10 or later (i.e., LTE Advanced).

Hereinafter, (1) outline of LIE system, (2) outline of MBMS, (3) configurations of HeNB, eNB, and UE, and (4) operations of HeNB, eNB, and UE are described in this order.

(1) Outline of LTE System

FIG. 1 shows a configuration of an LTE system. As shown in FIG. 1, the LTE system is formed of an E-UTRAN (Evolved-UMTS Terrestrial Radio Access Network), a UE (User Equipment), and an EPC (Evolved Packet Core).

The E-UTRAN includes an eNB (evolved Node-B), a HeNB (Home evolved Node-B), and a HeNB GW (Home evolved Node-B Gateway).

The eNB manages a macrocell and performs radio communication with the UE which establishes a connection with the macrocell.

The macrocell supports MBMS. To be specific, the macrocell is capable of transmitting MBMS data by PIM (multicast). In the first embodiment, the macrocell corresponds to a general cell, and the eNB corresponds to a general base station.

The HeNB manages a CSG (Closed Subscriber Group) cell to which only an authorized UE is allowed access, the CSG cell is a cell of a smaller coverage than the macrocell. The HeNB performs radio communication with the UE which establishes a connection with the CSG cell.

The CSG cell does not support MBMS. To be specific, the CSG cell is not capable of transmitting MBMS data by PIM. Note, however, that the CSG cell is capable of transmitting MBMS data by PTP (unicast). In the first embodiment, the CSG cell corresponds to a specific cell, and the HeNB corresponds to a specific base station.

In addition, the eNB and the HeNB have a radio resource management (RRM) function, a user data routing function, and a measurement control function for mobility control and scheduling, for example.

Multiple HeNBs are connected to the HeNB GW, and the HeNB GW manages the multiple HeNBs.

The EPC includes MMEs (Mobile Management Entities) and S-GWs (Serving-Gateways). The MME is a network entity for performing various mobility control for the UE, and corresponds to a control station. The S-GW is a network entity for controlling transfer of user data, and corresponds to an exchange.

The eNBs (the HeNBs) are mutually connected over an X2 interface. The eNB (the HeNB) is connected with the MME and the S-GW (HeNB GW) over an S1 interface. The X2 interface and the S1 interface form network interfaces.

The UE is a mobile radio communication device, and performs radio communication with a cell (serving cell) with which it establishes a connection. In the first embodiment, the UE corresponds to a user terminal.

The UE in an idle mode (RRC idle mode) corresponding to a standby mode selects a cell on which to camp, and camps on the selected cell. Processing of changing the cell on which to camp in the RRC idle mode is referred to as cell reselection.

The UE in a connected mode (RRC connected mode) corresponding to a communicating state performs radio communication with the serving cell. Processing of changing the serving cell in the RRC connected mode is referred to as handover.

The UE supports MBMS. Specifically, the UE in the RRC idle mode or in the RRC connected mode can receive MBMS data transmitted from the eNB by PTM.

Figure 2:
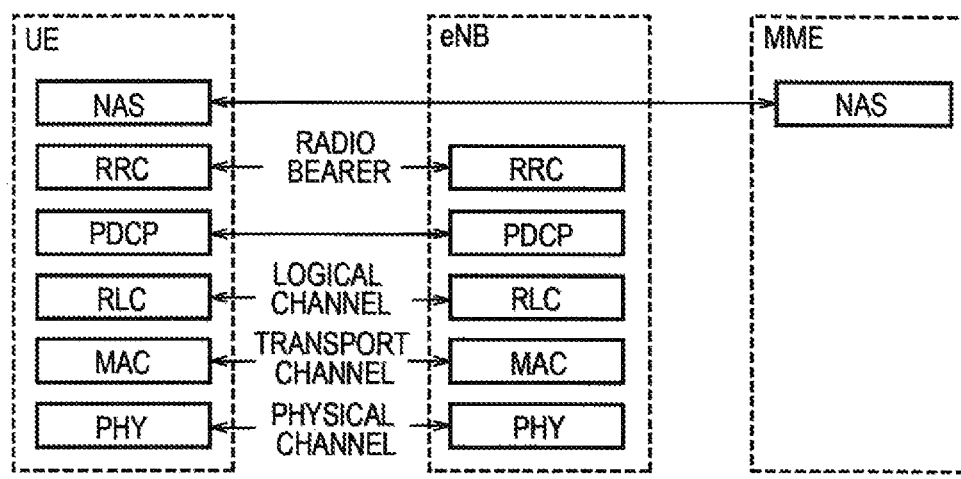
FIG. 2 shows a protocol stack of a radio interface of the LTE system according to the first and second embodiments.

FIG. 2 shows a protocol stack of a radio interface of the LTE system.

As shown in FIG. 2, radio interface protocols are classified into layer 1 to layer 3 of the OSI reference model, where layer 1 is the physical (PHY) layer. Layer 2 includes the MAC (Media Access Control) layer, the RLC (Radio Link Control) layer, and the PDCP (Packet Data Convergence Protocol) layer. Layer 3 includes the RRC (Radio Resource Control) layer.

The physical layer performs data coding/decoding, modulation/demodulation, antenna mapping/demapping, and resource mapping/demapping. The physical layer provides a transmission service to the upper layers through a physical channel. Data is transmitted through physical channels between the physical layer of the UE and the physical layer of the eNB. The physical layer is connected to the MAC layer via transport channels.

The MAC layer performs priority control of data, retransmission processing by hybrid ARQ (HARQ), and the like. Data is transmitted through transport channels between the MAC layer of the UE and the MAC layer of the eNB. The MAC layer of the eNB includes a MAC scheduler configured to determine a transport format and resource blocks to be used in the uplink and the downlink. A transport format includes a transport block size, a modulation and coding scheme (MCS), and antenna mapping.

The RLC layer uses the functions of the MAC layer and the physical layer to transmit data to the RLC layer on the reception side. Data is transmitted through logical channels between the RLC layer of the UE and the RLC layer of the eNB.

The PDCP layer performs header compression/decompression and encryption/decoding.

The RRC layer is defined only in a control plane. Data is transmitted through radio bearers between the RRC layer of the UE and the RRC layer of the eNB. The RRC layer controls logical channels, transport channels, and physical channels according to establishment, reestablishment and release of the radio bearers. When an RRC connection is established between the RRC of the UE and the RRC of the eNB, the UE is in an RRC connected mode, and if not, the UE is in an RRC idle mode.

A NAS (Non-Access Stratum) layer positioned higher than the RRC layer performs session management, mobility management and the like.

Figure 3:
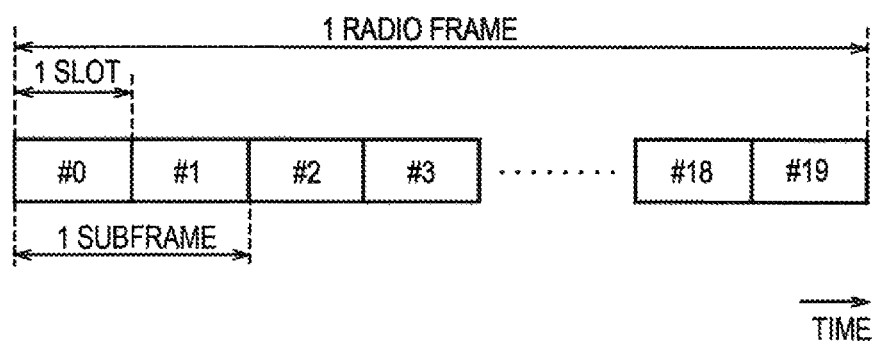
FIG. 3 shows a configuration of a radio frame used in the LTE system according to the first and second embodiments.

FIG. 3 shows a configuration of a radio frame used in the LTE system. The LTE system employs OFDMA (Orthogonal Frequency Division Multiplexing Access) in the downlink, and SC-FDMA (Single Carrier Frequency Division Multiple Access) in the uplink.

As shown in FIG. 3, a radio frame is formed of ten subframes aligned in the time direction, and each subframe is formed of two slots arranged side by side in the time direction. Each subframe is 1 ms in length, and each slot is 0.5 ms in length. Each subframe includes multiple resource blocks (RB) in the frequency direction, and includes multiple symbols in the time direction. A guard interval called a cyclic prefix (CP) is provided at the beginning of each symbol.

In the downlink, an interval of the couple of symbols at the beginning of each subframe is mainly a control region used as physical downlink control channels (PDCCHs). The remaining interval of the subframe is a data region mainly used as physical downlink shared channels (PDSCHs).

In the uplink, the two end portions of each subframe in the frequency direction are control regions mainly used as physical uplink control channels (PUCCHs). A center portion of the subframe in the frequency direction is a data region mainly used as physical uplink shared channels (PUSCHs).

(2) Outline of MBMS

MBMS is a bearer service for achieving broadcast transmission, and is a scheme in which MBMS data is simultaneously transmitted by a common bearer to multiple UEs desiring to receive the MBMS data.

In the LTE system, multiple eNBs form an MBSFN (MBMS Single Frequency Network), and MBMS data can be transmitted by an MBSFN transmission scheme. The eNBs included in the MBSFN simultaneously and synchronously send the same signal. Accordingly, the UE can perform RF (Radio Frequency) synthesis for signals sent from the eNBs.

Figure 4:
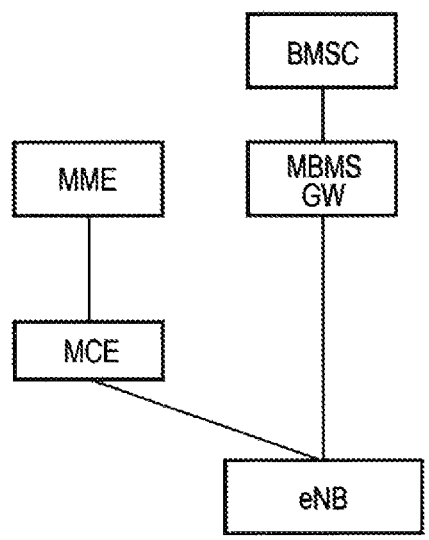
FIG. 4 shows a logical composition of an eMBMS base according to the first and second embodiments.

FIG. 4 shows a logical composition of an eMBMS infrastructure. As shown in FIG. 4, other than the network entities shown in FIG. 1, the LTE system includes a BMSC (Broadcast Multicast Service Center), an MBMS GW (MBMS Gateway), and an MCE (Multi-Cell Multicast Coordination Entity).

The BMSC holds MBMS data to be transmitted. The MBMS GW transmits the MBMS data held by the BMSC to the eNBs by IP (Internet Protocol) multicast. For each of the eNBs in the MBSFN, the MCE synchronizes the MBMS data or assigns a radio resource for the MBMS data.

Figure 5:
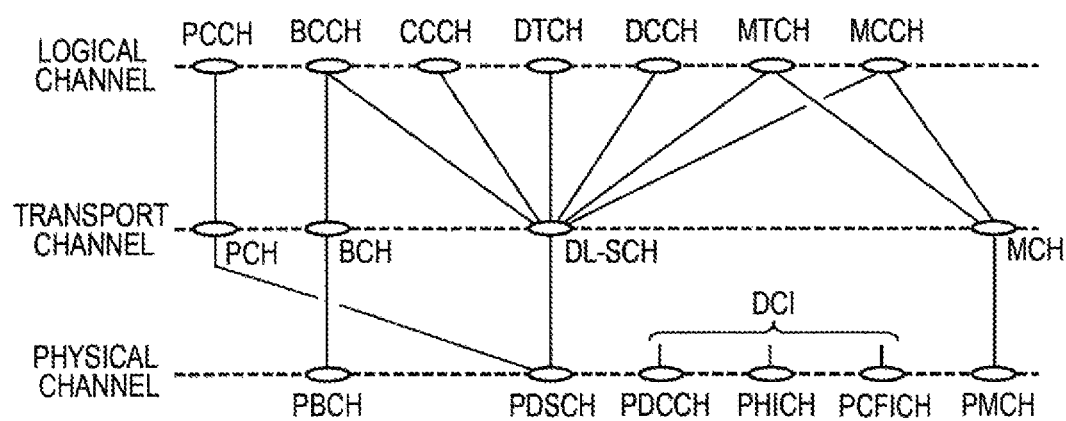
FIG. 5 shows mapping among logical channels, transport channels, and physical channels according to the first and second embodiments.

FIG. 5 shows mapping among logical channels, transport channels, and physical channels in the downlink. As shown in FIG. 5, the LTE system defines an MTCH (Multicast Traffic Channel) and an MCCH (Multicast Control Channel) as logical channels for MBMS. Additionally, the LTE system defines an MCH (Multicast Channel) as a transport channel for MBMS.

The macrocell (specifically, the eNB managing the macrocell) sends MBMS data, and MBMS service information for controlling MBMS data transmission, through the multicast channel (the MTCH and the MCCH) by multicast.

On the other hand, the CSG cell (specifically, the HeNB managing the CSG cell) cannot use the MTCH or the MCCH. Note, however, that the CSG cell can transmit MBMS data to a UE establishing an RRC connection with the CSG cell, through a channel such as a DTCH (Dedicated Traffic Channel) and a DCCH (Dedicated Control Channel) by unicast.

It is to be noted that the macrocell and the CSG cell send broadcast information through a broadcast channel (BCCH; Broadcast Control Channel) by broadcast. Broadcast information is information such as a MIB (Master Information Block) and a SIB (System Information Block), for example.

(3) Configurations of HeNB, eNB, and UE (3.1) Configuration of HeNB

Figure 6:
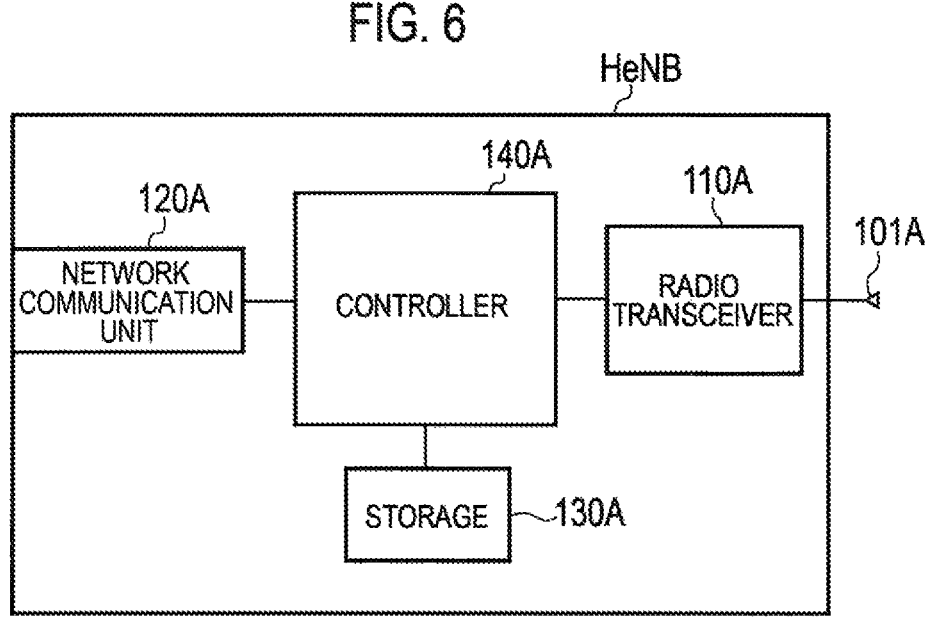
FIG. 6 is a block diagram of a HeNB according to the first and second embodiments.

FIG. 6 is a block diagram of the HeNB. As shown in FIG. 6, the HeNB includes an antenna 101A, a radio transceiver 110A, a network communication unit 120A, a storage 130A, and a controller 140A.

The antenna 101A and the radio transceiver 110A are used for transmission and reception of radio signals. The network communication unit 120A performs communication over the network interface. The storage 130A is a memory, for example, and stores therein information used for control by the controller 140A. The controller 140A is a processor (CPU), for example, and performs processing in the aforementioned layers, as well as performs various control to be described below.

The controller 140A also generates CSG cell load information indicating a load level of the CSG cell (HeNB). A load level of the CSG cell (HeNB) refers to any of the following, for example.

Number of blocks used or usage rate of resource blocks (RB) in CSG cell (HeNB)
Usage rate of memory and CPU in CSG cell (HeNB)
Amount of downlink data buffered in CSG cell (HeNB)
Number of UEs establishing RRC connection with CSG cell (HeNB)
Number of Received Random Access Preambles per unit time in CSG cell (HeNB)
Packet Delay in CSG cell (HeNB)
Data Loss rate in CSG cell (HeNB)
Scheduled IP Throughput in CSG cell (HeNB)

In the first embodiment, the controller 140A controls the network communication unit 120A so that the network communication unit 120A sends CSG cell load information to the macrocell (eNB) over the network interface.

The controller 140A may send the CSG cell load information to the macrocell (eNB) in response to a request from the macrocell (eNB). To be specific, the controller 140A may return a single reply (transmission of CSG cell load information) to a single request, or may keep sending the CSG cell load information periodically in response to a single request, until receiving a stoppage request.

Alternatively, even if no request is received from the macrocell (eNB), the controller 140A may periodically send the CSG cell load information to the macrocell (eNB).

Otherwise, even if no request is received from the macrocell (eNB), the controller 140A may send the CSG cell load information to the macrocell (eNB) when the load exceeds a reference value. Specifically, the controller 140A may make a single transmission (transmission of CSG cell load information) when the load exceeds the reference value, or when the load exceeds the reference value, may keep sending the CSG cell load information periodically until the load falls below the reference value or receiving a stoppage request from the macrocell (eNB).

(3.2) Configuration of eNB

Figure 7:
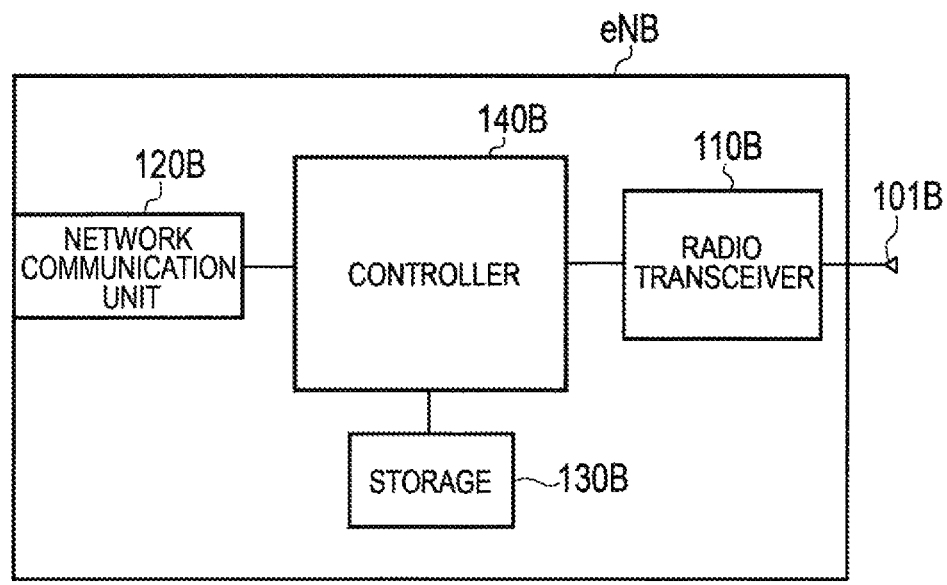
FIG. 7 is a block diagram of an eNB according to the first and second embodiments.

FIG. 7 is a block diagram of the eNB. As shown in FIG. 7, the eNB includes an antenna 101B, a radio transceiver 110B, a network communication unit 120B, a storage 130B, and a controller 140B.

The antenna 101B and the radio transceiver 110B are used for transmission and reception of radio signals. The network communication unit 120B performs communication over the network interface. The storage 130B is a memory, for example, and stores therein information used for control by the controller 140B. The controller 140B is a processor (CPU), for example, and performs processing in the aforementioned layers, as well as performs various control to be described below.

The controller 140B also generates macrocell load information indicating a load level of the macrocell (eNB). A load level of the macrocell (eNB) refers to any of the following, for example.

Number of blocks used or usage rate of resource blocks (RB) in macrocell (eNB)
Usage rate of memory and CPU in macrocell (eNB)
Amount of downlink data buffered in macrocell (eNB)
Number of UEs establishing RRC connection with macrocell (eNB)
Number of Received Random Access Preambles per unit time in macrocell (eNB)
Packet Delay in macrocell (eNB)
Data Loss rate in macrocell (eNB)
Scheduled IP Throughput in macrocell (eNB)

In the first embodiment, the controller 140B controls the network communication unit 120B so that the network communication unit 120B receives CSG cell load information for each of the CSG cells (HeNBs) in the macrocell. Then, the controller 140B controls the radio transceiver 110B so that the radio transceiver 110B broadcasts macrocell load information with the CSG cell load information. The controller 140B may send the macrocell load information and the CSG cell load information by including them in a SIB.

Note that the controller 140B may perform control such that the macrocell load information is sent during a period in which the load level of the macrocell (eNB) exceeds a predetermined level, and the macrocell load information is not sent during a period in which the load level does not exceed the predetermined level.

Moreover, the controller 140B may perform control such that the CSG cell load information is sent during a period in which the load level of the CSG cell (HeNB) exceeds a predetermined level, and the CSG cell load information is not sent during a period in which the load level does not exceed the predetermined level.

(3.3) Configuration of UE

Figure 8:
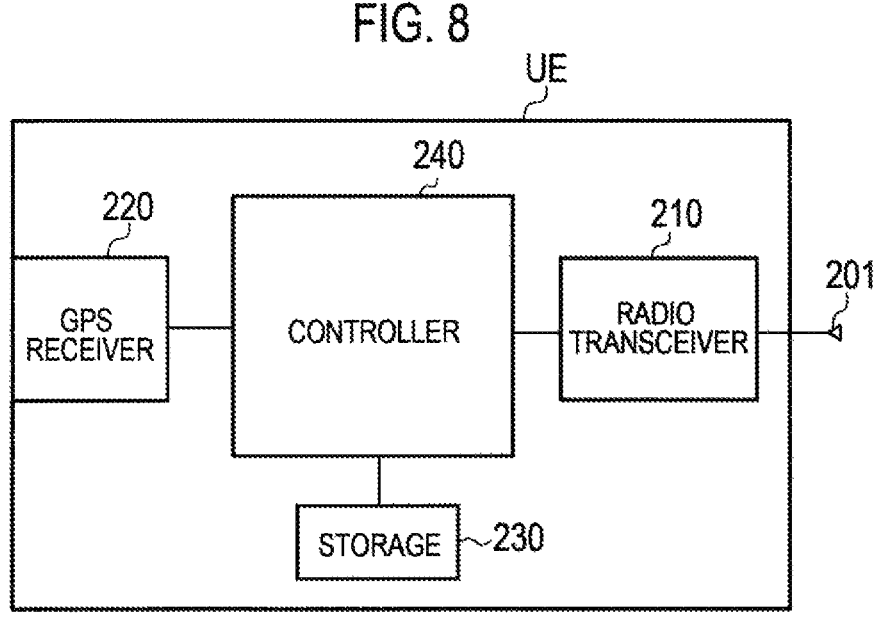
FIG. 8 is a block diagram of a UE according to the first and second embodiments.

FIG. 8 is a block diagram of the UE. As shown in FIG. 8, the UE includes an antenna 201, a radio transceiver 210, a GPS (Global Positioning System) receiver 220, a storage 230, and a controller 240.

The antenna 201 and the radio transceiver 210 are used for transmission and reception of radio signals. The GPS receiver 220 receives GPS signals to acquire UE location information indicating location of the UE. The storage 230 stores therein information used for control by the controller 240. The controller 240 performs processing in the aforementioned layers, as well as performs various control to be described below. The controller 240 also acquires UE location information based on an output of the GPS receiver 220. Note that in a case where the UE does not have the GPS receiver 220, the UE location information may be acquired on the basis of a radio signal received by the radio transceiver 210.

The storage 230 stores therein a white list which is a list of GSG cells to which the UE is allowed access (specifically, a list of CSG IDs). The storage 230 also stores therein GSG cell location information indicating locations of the GSG cells to which the UE is allowed access. The GSG cell location information is used with the UE location information in an autonomous search procedure, which is processing for determining whether or not there is a GSG cell to which the UE is allowed access near the UE.

In the first embodiment, the controller 240 controls selection of a cell on which the UE camps (Cell Reselection) in the RRC idle mode.

Generally, the controller 240 assigns a rank to each cell according to a result of comparison between the quality ($Q_{meas,\,s}$) of the current cell and the quality ($Q_{meas,\,n}$) of a neighboring cell. The controller 240 selects the cell of the highest rank as the cell on which to camp. Note that a neighboring cell is a cell in the neighborhood of the current cell, as a matter of course. To be specific, the controller 240 adds a hysteresis ($Q_{Hyst}$) to the quality ($Q_{meas,\,s}$) of the current cell to calculate a rank ($R_s$) of the current cell. The controller 240 otherwise subtracts an offset (Qoffset) from the quality ($Q_{meas,\,s}$) of the neighboring cell to calculate a rank ($R_n$) of the current cell.

Alternatively, based on a cell frequency priority (cell Reselection Priority), the controller 240 selects the cell of the highest priority as the cell on which to camp. Alternatively, based on the ranking result and the priority (cell Reselection Priority), the controller 240 selects the cell of the highest priority as the cell on which to camp. It is to be noted that a rank indicates the priority with which the cell is selected as the cell on which to camp, and thus may be regarded as a type of priority.

Note that the hysteresis ($Q_{Hyst}$) the offset (Qoffset), and the priority (cell Reselection Priority) are information broadcasted from the macrocell (eNB).

Meanwhile, if a CSG cell included in the list of CSG cells to which the UE is allowed access (i.e., white list) is included in the neighboring cells, the highest priority is set for this CSG cell. In other words, if a CSG cell included in the white list is included in the neighboring cells, the controller 240 selects the CSG cell as the cell on which to camp. For example, if the frequency of the CSG cell is different from that of the macrocell, the highest priority may be set for the CSG cell. Note that if the frequency of the CSG cell is the same as that of the macrocell, the highest priority may be set for the CSG cell.

Hereinabove, a description has been given of general cell selection. In the first embodiment, the controller 240 controls cell reselection in the following manner under specific conditions.

When receiving MBMS data transmitted from the macrocell by PTM in the RRC idle mode, and the frequency of the macrocell is different from that of the CSG cell, the controller 240 sets a higher cell selection priority for the macrocell than for the CSG cell. On the other hand, when receiving MBMS data transmitted from the macrocell by PTM in the RRC idle mode, and the frequency of the macrocell is the same as that of the CSG cell, the controller 240 sets a higher cell selection priority for the CSG cell than for the macrocell.

Moreover, assume a case of receiving MBMS data transmitted from the macrocell by PTM in the RRC idle mode, the frequency of the macrocell is different from that of the CSG cell, and uplink data to be sent is generated, i.e., unicast data needs to be exchanged. In this case, the controller 240 controls cell reselection based on the macrocell load information and the CSG cell load information to appropriately select a cell with which to establish an RRC connection. Here, it is preferable that the controller 240 controls the cell reselection in consideration not only of the macrocell load information and the CSG cell load information, but also of whether or not continuous reception of MBMS data is desired (i.e., whether or not the user is still interested in MBMS). Then, the UE establishes an RRC connection with the selected cell and transits to the RRC connected mode. Details of the cell reselection control based on the macrocell load information and the CSG cell load information will be given later.

(4) Operations of HeNB, eNB, and UE

Figure 9:
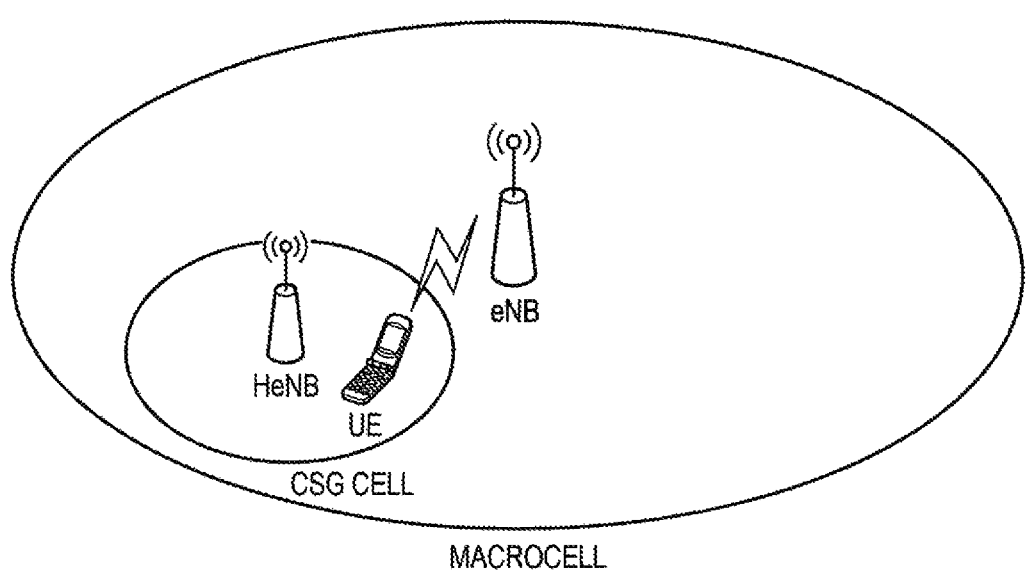
FIG. 9 shows an operation environment of the eNB and the UE according to the first and second embodiments.

FIG. 9 shows an operation environment of the eNB and the UE according to the first embodiment.

As shown in FIG. 9, a CSG cell operated at a frequency different from that of the macrocell is provided inside the macrocell, and the UE in the RRC idle mode is located at a point where the macrocell and the CSG cell overlaps with each other. Here, the UE is a member UE of the CSG cell, and is allowed access to the CSG cell.

In such a case, the UE normally detects that it is near the CSG cell by the autonomous search procedure, for example, and sets the highest priority for the CSG cell to select the CSG cell as the cell on which to camp.

However, the UE desires to receive MBMS data, and in order to receive MBMS data transmitted from the macrocell by PTM, sets the highest priority for the macrocell to select the macrocell as the cell on which to camp.

Assume a case where the UE receiving the MBMS data transmitted from the macrocell by PTM in the RRC idle mode detects that it is near the CSG cell having a frequency different from the macrocell and to which it is allowed access. In this case, the UE determines whether or not to perform cell reselection (cell reselection control) from the macrocell to the CSG cell, according to the following three criteria.

Macrocell load information and/or CSG cell load information broadcasted from macrocell Whether or not uplink data to be sent is generated (i.e., whether or not unicast data needs to be exchanged)

Whether or not continuous reception of MBMS data is desired (i.e., whether or not the user is still interested in MBMS)

(4.1) Cell Reselection Control

FIG. 10 shows cell selection control according to the first embodiment.

As shown in FIG. 10, assume a case where the UE receiving MBMS data transmitted from the macrocell by PTM in the RRC idle mode detects that it is near the CSG cell having the frequency different from the macrocell and to which it is allowed access. Even in this case, if no uplink data to be sent is generated (this state is referred to below as "unicast unnecessary"), the UE does not perform cell reselection from the macrocell to the CSG cell, and maintains the RRC idle mode with the macrocell being selected. Thus, it is possible to avoid unnecessary cell reselection. In contrast, if uplink data to be sent is generated (this state is referred to below as "unicast necessary"), the UE performs cell reselection (and connection proces sing) based on the macrocell load information and/or the CSG cell load information broadcasted from the macrocell.

To be specific, if one of the macrocell and the CSG cell is in a high load state and the other is in a low load state, the one cell is assigned a lower cell selection priority and/or the other cell is assigned a higher cell selection priority. Note that a cell in a high load state indicates a case where load information on the cell is higher than a threshold. A cell in a low load state indicates a case where load information on the cell is lower than a threshold, or where there is no load information on the cell (i.e., the load information is not sent).

For example, when the macrocell is in the high load state and the CSG cell is in the low load state, the UE sets the highest priority for the CSG cell to perform cell reselection from the macrocell to the CSG cell and establish an RRC connection with the CSG cell. In this case, if the UE transitioned to the RRC connected mode desires to continue reception of MBMS data, the UE can receive the MBMS data transmitted from the CSG cell by PTP (unicast).

On the other hand, when the CSG cell is in the high load state and the macrocell is in the low load state, the UE sets the highest priority for the macrocell to establish an RRC connection with the macrocell without performing cell reselection from the macrocell to the CSG cell. In this case, if the UE transitioned to the RRC connected mode desires to continue reception of MBMS data, the UE can receive the MBMS data transmitted from the macrocell by PTM (multicast).

Thus, assume a case where the UE receiving MBMS data transmitted from the macrocell by PIM in the RRC idle mode detects that it is near the CSG cell having a frequency different from the macrocell andto which it is allowed access. Here, when unicast is necessary, the UE preferentially selects the cell in a low load state from among the macrocell and the CSG cell, and establishes an RRC connection with the selected cell. Hence, establishment of the RRC connection with the cell in a high load state can be avoided, and thus degradation in the service quality received by the UE can be suppressed.

Moreover, assume a case where unicast is necessary, both of the macrocell and the CSG cell are in a low load state, and continuous reception of MBMS data is desired (this state is referred to below as "MBMS necessary"). Here, the UE sets the highest priority for the macrocell to establish an RRC connection with the macrocell without performing cell reselection from the macrocell to the CSG cell. In this case, the UE transitioned to the RRC connected mode can receive MBMS data transmitted from the macrocell by PTM (multicast). Moreover, even when the UE transitions from the RRC connected mode to the RRC idle mode after establishing the RRC connection with the macrocell, the UE can receive MBMS data (and MBMS service information) transmitted from the macrocell by PTM.

Meanwhile, assume a case where unicast is necessary, both of the macrocell and the CSG cell are in a low load state, and continuous reception of MBMS data is not desired (this state is referred to below as "MBMS unnecessary"). Here, as in the case of a general method, the UE sets the highest priority for the CSG cell to perform cell reselection from the macrocell to the CSG cell and establish an RRC connection with the CSG cell.

Note that even when unicast is necessary, if both of the macrocell and the CSG cell are in a high load state, the UE may not be able to receive service of sufficient quality by connecting to any of the macrocell or the CSG cell. For this reason, when unicast is necessary, both of the macrocell and the CSG cell are in a high load state, and MBMS is necessary, the UE establishes an RRC connection with the macrocell. Since the UE can receive MBMS data by PTM in this way, required resources can be reduced.

Meanwhile, when unicast is necessary, both of the macrocell and the CSG cell are in a high load state, but MBMS is unnecessary, the UE may either establish an RRC connection with the macrocell or establish an RRC connection with the CSG cell after performing cell reselection fromthe macrocell to the CSG cell. Note, however, that in order to make it easier for other UEs to utilize resources of the macrocell, it is preferable that the UE establish the RRC connection with the CSG cell after performing the cell reselection from the macrocell to the CSG cell.

(4.2) Operation Sequence

FIG. 11 is a sequence chart showing operations of the HeNB, the eNB, and the UE according to the first embodiment. Here, operations in the operation environment shown in FIG. 9 will be described. Specifically, the UE receiving MBMS data transmitted from the macrocell by PTM in the RRC idle mode detects that it is near the CSG cell having a frequency different from the macrocell and to which it is allowed access.

As shown in FIG. 11, in step S11, the UE receives MBMS data transmitted from the macrocell by PTM in the RRC idle mode.

In step S12, the CSG cell (HeNB) sends CSG cell load information to the macrocell (eNB) over the network interface. Note that the CSG cell (HeNB) may send the CSG cell load information to the macrocell (eNB) over the S1 interface (via the MME).

In step S13, the macrocell (eNB) broadcasts CSG cell load information and macrocell load information. The UE receives the CSG cell load information and the macrocell load information.

In step S14, the UE performs the aforementioned cell reselection control. Specifically, the UE determines whether or not to perform cell reselection (cell reselection control) from the macrocell to the CSG cell, according to the following three criteria.

Macrocell load information and/or CSG cell load information broadcasted from macrocell Whether or not uplink data to be sent is generated (i.e., whether or not unicast data needs to be exchanged)

Whether or not continuous reception of MBMS data is desired (i.e., whether or not the user is still interested in MBMS)

In step S15, when uplink data to be sent is generated, the UE establishes an RRC connection with the cell selected as the cell on which to camp in the cell reselection control in step S14. Note that the procedure for establishing the RRC connection includes a random access procedure.

Second Embodiment

In the first embodiment described above, the CSG cell (HeNB) sends CSG cell load information to the macrocell (eNB) over the network interface.

In a second embodiment, a CSG cell (HeNB) broadcasts CSG cell load information over the radio interface. Note, however, that the CSG cell (HeNB) may perform control such that the CSG cell load information is sent during a period in which the load level of the CSG cell (HeNB) exceeds a predetermined level, and the CSG cell load information is not sent during a period in which the load level does not exceed the predetermined level.

FIG. 12 is a sequence chart showing operations of the HeNB, an eNB, and a UE according to the second embodiment. Here, operations in the operation environment shown in FIG. 9 will be described. Specifically, the UE receiving MBMS data transmitted from a macrocell by PTM in the RRC idle mode detects that it is near the CSG cell having a frequency different from the macrocell and to which it is allowed access.

As shown in FIG. 12, in step S21, the UE receives MBMS data transmitted from the macrocell by PTM in the RRC idle mode.

In step S22, the macrocell (eNB) broadcasts macrocell load information. The UE receives the macrocell load information In step S23, the CSG cell (HeNB) broadcasts CSG cell load information. For example, the CSG cell (HeNB) sends the CSG cell load information by including it in a SIB. The UE uses a neighboring cell monitoring procedure to receive the CSG cell load information broadcasted from the CSG cell (HeNB).

In step S24, the UE performs the aforementioned cell reselection control. Specifically, the UE determines whether or not to perform cell reselection (cell reselection control) from the macrocell to the CSG cell, according to the following three criteria.

Macrocell load information broadcasted from macrocell and/or CSG cell load information broadcasted from CSG cell (HeNB)

Whether or not uplink data to be sent is generated (i.e., whether or not unicast data needs to be exchanged)

Whether or not continuous reception of MBMS data is desired (i.e., whether or not the user is still interested in MBMS)

In step S25, when uplink data to be sent is generated, the UE establishes an RRC connection with the cell selected as the cell on which to camp in the cell reselection control in step S24.

Other Embodiments

It should not be understood that the description and drawings which constitute part of this disclosure limit the present disclosure. From this disclosure, various alternative embodiments, examples, and operation techniques will be easily found by those skilled in the art.

Although the embodiments above describe operations of the macrocell (eNB) supporting MBMS, a macrocell (eNB) not supporting MBMS may be configured not to perform the operations according to the embodiments described above (i.e., operations related to load information).

The macrocell (eNB) supporting MBMS may be configured to perform the operations according to the embodiments described above (i.e., operations related to load information) only when it is providing the MBMS service (when it is transmitting MBMS data). In other words, the macrocell supporting MBMS may perform the operation during a period in which MBMS data is transmitted, and not perform the operation during a period in which the MBMS data is not transmitted.

In addition, although in the above embodiments the UE controls cell reselection based on both of macrocell load information and CSG cell load information, the UE may control cell reselection based only on macrocell load information and not on CSG cell load information. For example, when uplink data to be sent is generated under a condition where macrocell load information is higher than a predetermined threshold, (i.e., the macrocell is in a high load state), the UE establishes an RRC connection with the CSG cell after performing cell reselection from the macrocell to the CSG cell. Further, after establishing the RRC connection with the CSG cell, the UE may receive MBMS data from the CSG cell by PTP.

The embodiments above describe an example where the general cell is the macrocell, and the specific cell is the CSG cell. However, the general cell may be a cell smaller than the macrocell, such as a picocell. The specific cell may be a hybrid cell. A UE belonging to the CSG regards the hybrid cell as a CSG cell, and a UE not belonging to the CSG regards the hybrid cell as an open cell. Hence, a hybrid cell can be considered as a type of a CSG cell.

Moreover, although the embodiments above are explained by taking the LTE system as an example, the present disclosure is also applicable to other communication standards such as the UMTS (Universal Mobile Telecommunication System).

INDUSTRIAL APPLICABILITY

As described, the present disclosure is useful in radio communications field such as mobile communications.

The invention claimed is:

1. A communication control method comprising:
   transmitting load information on load of a second radio communication apparatus, by a first radio communication apparatus supporting PTM (Point-to-Multipoint) transmission of MBMS (Multimedia Broadcast Multicast Service) data, wherein the second radio communication apparatus does not support PTM transmission of MBMS data;
   receiving the MBMS data from the first radio communication apparatus, by a user terminal in an idle mode with the first radio communication apparatus selected as a communication target of the user terminal;
   receiving, from the first radio communication apparatus, the load information on the load of the second radio communication apparatus, by the user terminal;
   storing a list of identifiers on the second radio communication apparatus, by the user terminal;
   controlling a reselection of the communication target from the first radio communication apparatus to the second radio communication apparatus by the user terminal, based on the list of identifiers and the load information on the load of the second radio communication apparatus, the load information received from the first radio communication apparatus; and
   continuing a reception of the MBMS data by setting a highest priority for the first radio communication apparatus regardless of the load information, in response to desiring a contiguous reception of the MBMS data, by the user terminal.

2. A user terminal comprising:

a receiver that receives load information on load of a second radio communication apparatus from a first radio communication apparatus supporting PTM (Point-to-Multipoint) transmission of MBMS (Multimedia Broadcast Multicast Service) data, the second radio communication apparatus not supporting PTM transmission of MBMS data, wherein the receiver receives the MBMS data from the first radio communication apparatus in an idle mode with the first radio communication apparatus selected as a communication target of the user terminal; and a controller that stores a list of identifiers on the second radio communication apparatus, and controls a reselection of the communication target fromthe first radio communication apparatus to the second radio communication apparatus based on the list of identifiers and the load information on the load of the second radio communication apparatus, the load information received from the first radio communication apparatus, wherein the controller continues a reception of the MBMS data by setting a highest priority for the first radio communication apparatus regardless of the load information, in response to desiring a contiguous reception of the MBMS data by the user terminal.

3. A device comprising:

memory storing instructions; and processor configured to execute the instructions to perform processes of:

receiving load information on load of a second radio communication apparatus from a first radio communication apparatus supporting PTM (Point-to-Multipoint) transmission of MBMS (Multimedia Broadcast Multicast Service) data, wherein the second radio communication apparatus does not support PTM transmission of MBMS data;

receiving the MBMS data from the first radio communication apparatus in an idle mode with the first radio communication apparatus selected as a communication target of the user terminal;

storing a list of identifiers on the second radio communication apparatus;

controlling a reselection of the communication target from the first radio communication apparatus to the second radio communication apparatus based on the list of identifiers and the load of the second radio communication apparatus, the load information received from the first radio communication apparatus; and continuing a reception of the MBMS data by setting a highest priority for the first radio communication apparatus regardless of the load information, in response to desiring a contiguous reception of the MBMS data.

* * * * *